US012768218B2

(12) United States Patent
Fleischmann et al.

(10) Patent No.: US 12,768,218 B2
(45) **Date of Patent: *Oct. 20, 2026**

(54) HARDWARE PREPARATION FILLER SYSTEM AND METHOD FOR FIRE RATED DOORS

(71) Applicant: National Guard Products, Inc., Memphis, TN (US)

(72) Inventors: Aron Wesley Fleischmann, Huxley, IA (US); Jeffrey Wayne Brewer, Somerville, TN (US)

(73) Assignee: National Guard Products, Inc., Memphis, TN (US)

(*) Notice: Subject to any disclaimer, the term of this patent is extended or adjusted under 35 U.S.C. 154(b) by 190 days.

This patent is subject to a terminal disclaimer.

(21) Appl. No.: 18/614,088

(22) Filed: Mar. 22, 2024

(65) Prior Publication Data

US 2024/0229547 A1 Jul. 11, 2024

Related U.S. Application Data

(63) Continuation of application No. 17/840,036, filed on Jun. 14, 2022, now Pat. No. 11,959,332.

(60) Provisional application No. 63/210,290, filed on Jun. 14, 2021.

(51) Int. Cl.
*E06B 5/16* (2006.01)
*B23P 6/00* (2006.01)
*E05B 17/00* (2006.01)

(52) U.S. Cl.
CPC .................. *E06B 5/16* (2013.01); *B23P 6/00* (2013.01); *E06B 5/161* (2013.01); *E06B 5/164* (2013.01); *B23P 2700/08* (2013.01); *E05B 17/0075* (2013.01); *Y10T 29/49625* (2015.01); *Y10T 29/49629* (2015.01); *Y10T 29/49735* (2015.01); *Y10T 29/49741* (2015.01)

(58) Field of Classification Search
CPC . E06B 5/16; E06B 5/161; E06B 5/164; E04G 23/0203; E04G 23/0207; E04G 23/0277
USPC .......................................................... 52/514
See application file for complete search history.

(56) References Cited

U.S. PATENT DOCUMENTS 1,048,923 A * 12/1912 Wheeler .................. E06B 5/16 52/784.14
4,281,479 A * 8/1981 Daus ....................... E06B 3/827 49/503
4,887,856 A * 12/1989 Percoco .............. E05B 15/0205 292/264
5,076,626 A * 12/1991 Tiddy ...................... E05B 15/02 52/514

(Continued)

FOREIGN PATENT DOCUMENTS

CA 2137499 C * 2/1998 ........... E06B 3/7001
DE 102014103252 A1 * 9/2015 ............. C04B 28/14

*Primary Examiner* — Christine T Cajilig
(74) *Attorney, Agent, or Firm* — K&L Gates LLP

(57) ABSTRACT

A method and system for achieving compliance for a fire-rated door assembly. To comply with fire rated door assembly codes and compliance, all components, including hardware must be listed and labeled by a certification agency, such as Underwriters Laboratories (UL). The disclosure may include a hardware preparation filler solution which allows fire-rated doors to maintain fire rating and compliance when removing or modifying hardware, or converting between hardware types.

20 Claims, 5 Drawing Sheets

(56) References Cited

U.S. PATENT DOCUMENTS

| | | | | |
|---|---|---|---|---|
| 5,603,194 | A | 2/1997 | Fridlyand et al. | |
| 5,816,017 | A * | 10/1998 | Hunt | E05B 65/1046 52/784.11 |
| 6,153,674 | A | 11/2000 | Landin | |
| 6,318,026 | B1 | 11/2001 | Ayres et al. | |
| 6,643,991 | B1 * | 11/2003 | Moyes | E06B 5/16 52/309.3 |
| 7,828,347 | B2 * | 11/2010 | Eller | E05B 63/08 292/357 |
| 2002/0124497 | A1 * | 9/2002 | Fortin | E06B 5/164 52/784.11 |
| 2007/0193220 | A1 * | 8/2007 | Daniels | E06B 5/16 52/784.11 |
| 2008/0229694 | A1 * | 9/2008 | Ising | E04G 23/0203 52/514 |
| 2008/0251264 | A1 * | 10/2008 | Eller | A62C 2/06 169/48 |
| 2011/0314755 | A1 * | 12/2011 | Langille | B32B 27/06 156/92 |
| 2016/0258174 | A1 * | 9/2016 | Gray | E04G 23/0203 |

* cited by examiner

Cylindrical Lockset for a Door

Cylindrical Locket for a Door

Mortise Locket for a Door

Flush Bolt Locket for a Door

Flush Bolt Locket for a Door

HARDWARE PREPARATION FILLER SYSTEM AND METHOD FOR FIRE RATED DOORS

CROSS-REFERENCE TO RELATED APPLICATION

This application is a continuation of U.S. patent application Ser. No. 17/840,036, filed Jun. 14, 2022, which claims priority to U.S. Provisional Patent Application No. 63/210,290, filed Jun. 14, 2021, the contents of which are herein incorporated by reference.

TECHNICAL FIELD

This disclosure generally relates to a method and system configured to allow hardware on a fire-rated door assembly to be modified (e.g., either removed completely, or replaced with another type of hardware) while maintaining the required compliance of the fire-rated door assembly.

BACKGROUND

Fire-rated doors may be generally constructed of materials that work together to slow or stop the spread of flames, smoke and, in certain applications, radiant and conductive heat transfer. Common materials of fire-rated doors may include wood, steel, fiberglass and fire-rated glass, or a combination of these materials. Structurally, a fire-rated door assembly may generally contain a frame, door(s), hardware, glazing, smoke seal gasket, and/or component parts. In application, fire-rated doors work in conjunction with surrounding passive fire protection systems to provide around-the-clock defense against fire and enable safe and unobstructed passage out of a building. When installed properly, the fire-rated doors will not combust or fail for the duration of their corresponding fire rating (in the average fire). Standard fire ratings vary, typically ranging from 20 to 180 minutes depending on code criteria. Fire-rated doors are required to be self-closing and positive latching, and must remain closed during a fire to protect the means of egress. Fire-rated door assemblies must comply with code requirements set forth by the National Fire Protection Association (NFPA), in particular, NFPA 101, Life Safety Code and NFPA 80, Standard for Fire Doors and Other Opening Protectives. These codes cover the installation, care and maintenance of many types of fire-rated doors and openings (i.e., assemblies). Specifically, NFPA 80 requires that all fire-rated door assemblies be inspected and tested annually. Facility managers may be responsible for ensuring that the annual inspection, testing, and record-keeping is performed. Any deficiencies must be corrected and documented, with follow-up acceptance by inspection and testing as per the authority having jurisdiction, in accordance with NFPA 80.

Generally, the inspection and testing may include the following 11 items: no open holes or breaks present on the surfaces of a fire-rated door assembly; glazing is intact and in place; doors, frames and hardware of the fire-rated door assembly are secured and in working order; parts are not missing or broken; door clearances are within required specifications; self-closing devices are operational; door coordinator (if installed) functions correctly; latching hardware secures the door when it is closed; auxiliary hardware does not interfere with the door or frame of the fire-rated door assembly; field modifications have not been made that void the label which indicates critical information about the original construction of the fire-rated door assembly, from its manufacturer and fire rating to whether it carries a temperature-rise rating; and gasketing and seals are in place, where required.

Generally, hardware of fire-rated door assemblies may include but not limited to cylindrical locksets, mortise locksets, flush bolt locksets, viewers (i.e., peepholes), magnetic locks, hold-open devices, etc. Typically, hardware may be affixed to a fire-rated door, either on an edge or a face, and may require some type of machining operation to the fire-rated door, which may result in removal of fire-rated material. The fire-rated material may be removed from the door and may be replaced or covered by the types of hardware previously mentioned. To comply with the fire-rated door assembly codes and compliance, the hardware must have been certified for the application type, and is listed and labeled by a certification agency such as Universal Laboratories (UL). UL is a global safety certification company that confirms the safety, performance, reliability and security of fire-resistant rated designs. Fire-resistance rated designs are used to achieve code compliant installations where the building codes require hourly rated designs (30 minutes fire resistance, 60 minutes fire resistance, 90 minutes fire resistance, etc.). UL can test assemblies to international standards, establishing an hourly rating to provide evidence of compliance to code requirements.

There is a need for a field-applied solution to repair and/or modify hardware of an existing fire-rated door, rather than replacing the fire-rated door, thereby accommodating the hardware being used on the exiting fire-rate door per a particular application.

BRIEF DESCRIPTIONS OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1A:
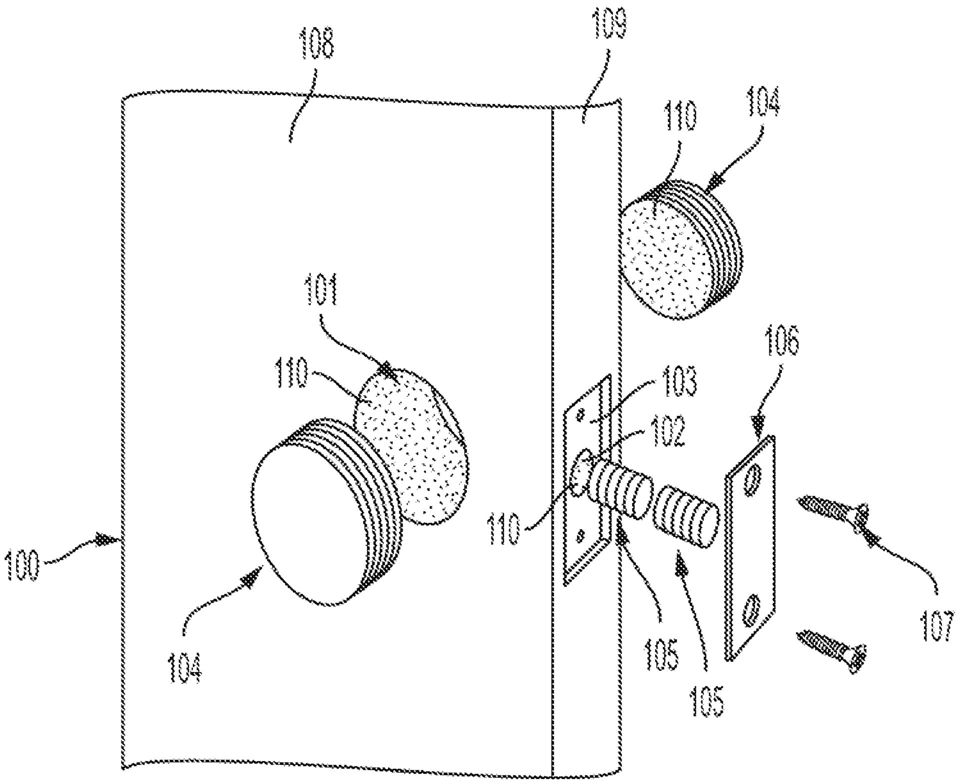
FIG. 1A illustrates a perspective view of a first example application for a cylindrical lockset in a fire-rated door, according to an aspect of the present disclosure.

The present disclosure generally relates to a hardware preparation filler system and method configured to repair and/or modify a fire-rated door when either removing the existing hardware of the fire-rated door or using a new hardware type over the existing hardware preparation's, such as through-holes, cylindrical and mortise locksets and flush bolts. In one embodiment, the present disclosure may be configured to restore fire-rated doors to their original conditions prior to machining for hardware preparations and drilling holes for attaching hardware. By restoring a fire-rated door to its original condition, the present disclosure may permit other hardware components to be used, provided that they comply with the relevant requirements of the existing fire-rated door. For example, NFPA 80 requires door assembly components comply with their individual listings and installation instructions including how these door assembly components were tested (e.g., minimum latch throw dimensions).

Among other features, the present disclosure may include one or more fire-rated panels, fire-rated caulk (e.g., Gap Guard™ Fire Caulk), steel filler plates (e.g., including edge filler plates, strike filler plates, latch bolt filler plates, and any suitable type of filler plates), and a plurality of fasteners as necessary. In one embodiment, each fire-rated panel may include a rigid, flat, non-combustible panel, which may or may not carry its own fire rating as a stand-alone product, and may be machined with traditional wood working tools and equipment. Additionally, each fire-rated panel of the present disclosure may have a screw-holding characteristic similar to that of plywood, particle board or similar wood substrate materials. The screw holding characteristic may provide means for particular or any suitable types of hardware and fastening methods to be used. In one aspect, each fire-rated panel, the fire-rated caulk, and the steel filler plates of the present disclosure may work as a system and upon cure of the fire-rated caulk, the area of the fire-rated door being repaired or modified using such a system may be equal to or better than the original condition of the door construction, as it maintains or improves the fire rating of the fire-rated door.

In accordance with aspects of the present disclosure, the fire-rated caulk may include a UL certified sealant solution for fire-rated doors and frames to seal through-holes as well as in combination with other hardware preparation filler solutions, specifically for door assemblies that include hardware preparation for 90 minute fire-rated solutions. Embodiments of the present disclosure may relate to filling voids created in a fire-rated door that are machined to receive a particular type of hardware. In accordance with an important aspect, the present disclosure provides a solution when either removing existing hardware on a fire-rated door and/or using a new hardware type over existing hardware preparations. In one embodiment, the fire-rated caulk of the present disclosure may be sodium silicate-based. The fire-rated caulk may be an independent sealant solution to fill or seal holes up to ½" in diameter, in fire-rated doors and frames up to 90 minute fire rating. In addition, the fire-rated caulk of the present disclosure may be used in combination with other materials as a UL certified sealant solution.

Figure 1B:
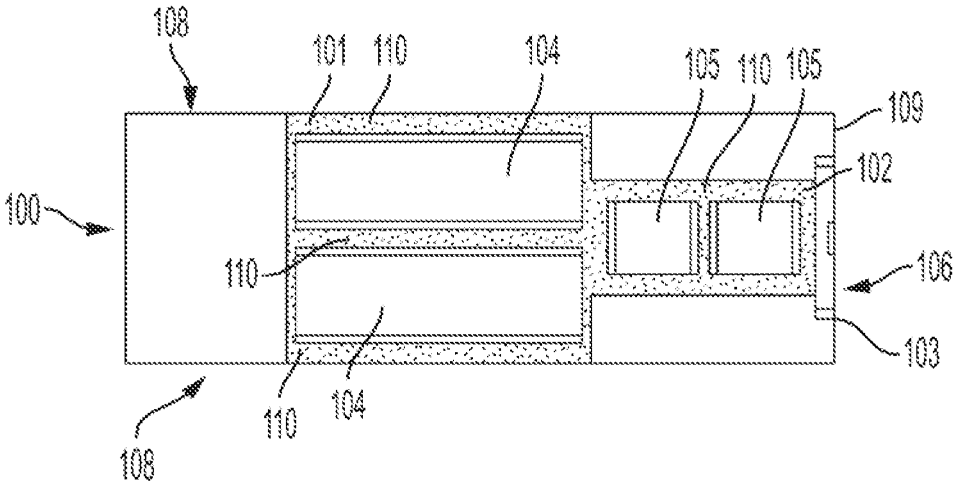
FIG. 1B illustrates a sectional view of the first example application of FIG. 1A, according to an aspect of the present disclosure.

In one embodiment, the present disclosure may be configured to repair a fire-rated door which has been previously prepared for a cylindrical lockset. FIGS. 1A and 1B illustrate a fire-rated door 100 including a machined bore 101 for a cylindrical lock body and handle implemented on faces 108 of the fire-rated door 100. A machined bore 102 for a cylindrical lock latch bolt and a pocket 103 for a filler plate may be located at an edge 109 of the fire-rated door 100. In one embodiment, the centerlines of the machined bores 101 and 102 may be co-planar and perpendicular to each other. In one example implementation, the machined bore 101 for the cylindrical lock body and handle may measure 2.125" in diameter, and may be backset from the edge 109 of the fire-rated door 100 (i.e., the distance from the edge 109 of the fire-rated door 100 to the center of machined bore) a dimension of 2.75", and may protrude through the door 100 creating a thru-hole opening between the faces 108 of the fire-rated door 100. The machined bore 102 for the cylindrical lock latch bolt may measure 1" in diameter and extend into the machined bore 101, creating a "T" shaped area to be repaired or modified with aspects of the present disclosure. The pocket 103 for the filler plate may measure 0.125" deep, 1.0" wide, and 2.0" tall and may be machined into the edge 109 of the fire-rated door 100 to receive an edge filler plate 106. In one example, the edge filler plate 106 may be made from cold rolled steel and measure 0.125" thick, 1.0" wide, and 2.0" tall. Further, the edge filler plate 106 may contain two holes to receive two fasteners 107 (e.g., #8×0.75" screws), such that the edge filler plate 106 may be securely installed in the pocket 103 on the edge 109 of the fire-rated door 100.

One example installation procedure of the present disclosure may include inserting a first fire-rated panel 104 (e.g., 2.0" in diameter and 0.75" thick) into the machined bore 101 for the cylindrical lock body and handle near the centerline of the fire-rated door 100. Subsequently, fire-rated caulk 110 may be applied to both sides of the first fire-rated panel 104 around the perimeter, and a second fire-rated panel 104 may be inserted, leaving a small amount of fire-rated caulk 110 between the two fire-rated panels 104. The fire-rated caulk 110 may then be applied around the perimeter of the second fire-rated panel 104 and inside the machined bore 102 for the cylindrical lock latch bolt. A pair of fire-rated panels 105, each measuring 1.0" in diameter, may be inserted through the machined bore 102 for the cylindrical lock latch bolt on the edge 109 of the fire-rated door 100. Specifically, fire-rated caulk 110 may be applied to the perimeter of a fire-rated panel 105 that is nearest the edge 109 of the fire-rated door 100. The edge filler plate 106 may then be inserted into the pocket 103 and secured to the edge 109 of the fire-rated door 100 using two fasteners 107.

Figure 2A:
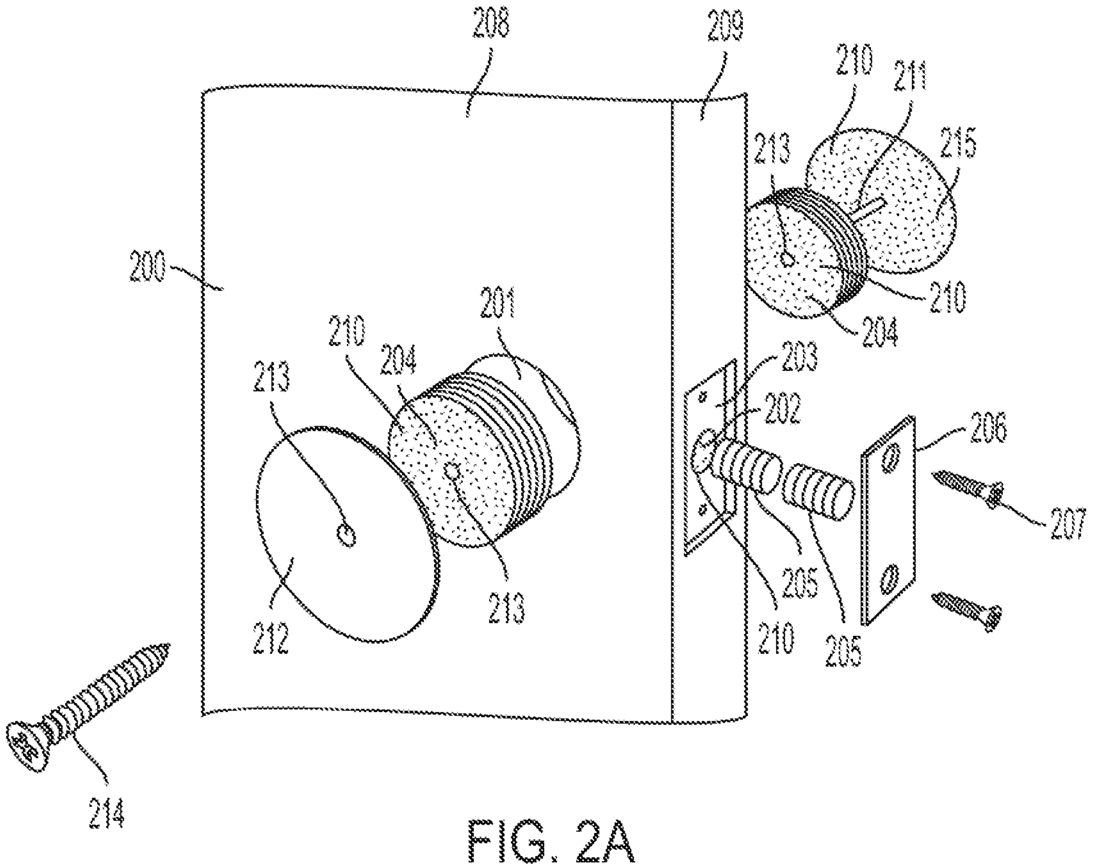
FIG. 2A illustrates a perspective view of a second example application for a cylindrical lockset in a fire-rated door, according to an aspect of the present disclosure.
Figure 2B:
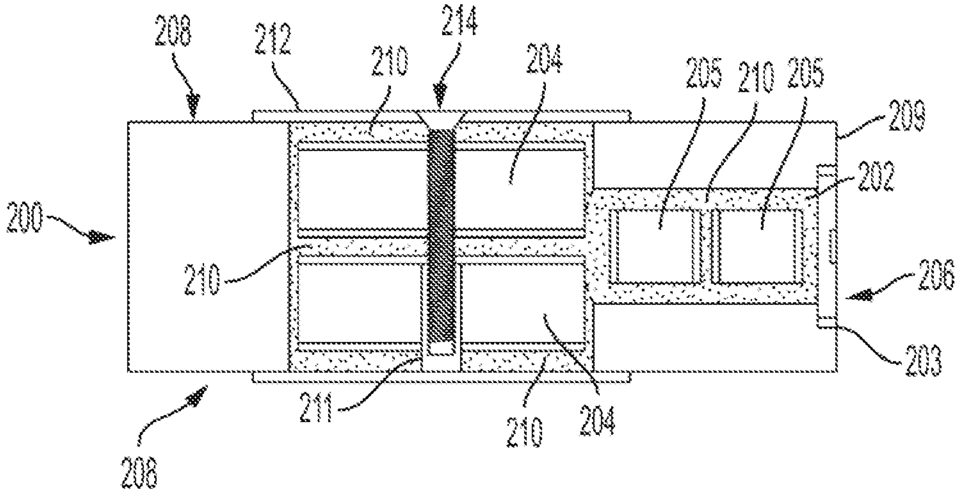
FIG. 2B illustrates a sectional view of the second example application of FIG. 2A, according to an aspect of the present disclosure.

In an alternate embodiment, referring to FIGS. 2A and 2B, filler plates may be used on faces 208 of a fire-rated door 200 to secure fire-rated panels 204 as a part of hardware preparation. In addition to the installation procedure described above with respect to FIGS. 1A and 1B, FIGS. 2A and 2B illustrate the modification made to fire-rated panels 204, whereby a thru-hole 213 measuring 0.25" in diameter may be machined at the center of each fire-rated panel 204, for receiving a respective fastener. Two face plates 212 and 215 may be used. For example, a first face plate 212 may contain a 0.25" diameter thru-hole 213 at the center, while a second face plate 215 may contain an internally threaded stud 211 measuring 0.25" in diameter and 1.5" long with #10-24 internal threads, located at the center. Each of the face plates 212 and 215 may be made from 16 gauge cold rolled steel and measure 2.625" in diameter.

In accordance with aspects of the present disclosure, an example installation procedure of the system shown in FIGS. 2A and 2B may include applying fire-rated caulk 210 near the perimeter of the face plate 215 at the side containing the internally threaded stud 211. Next, a first fire-rated panel 204 with thru-hole 213 may be assembled onto the face plate 215 via the internally threaded stud 211 passing through the thru-hole 213 of the first fire rated panel 204. Fire-rated caulk 210 may then be applied at the perimeter of the first fire-rated panel 204 and a second fire-rated panel 204 may be assembled onto the internally threaded stud 211, same as the first fire-rated panel 204. Fire-rated caulk 210 may be applied to the perimeter of the second fire-rated panel 204. Subsequently, the previously described assembly of face plate 215 and both fire-rated panels 204 may be passed through the machined bore 201 for a cylindrical lock body and handle, providing for proximity of the last applied fire-rated caulk 210 to be near face 208 of the fire-rated door 200. The thru-hole 213 of face plate 212 may be concentrically aligned with the thru-hole 213 of the second fire-rated panel 204, and the face plate 212 may be placed against the face 208 of the fire-rated door 200. At least one fastener 214 (e.g., a #10-24×1.50" long machine screw) may be threaded into the internally threaded stud 211 until the face plates 212 and 215 respectively rest tightly against both surface sides 208 of the fire-rated door 200. Further, the fire-rated caulk 210 may be applied inside the machined bore 202 for a cylindrical lock latch bolt through which two fire-rated panels 205 may be inserted. Fire-rated caulk 210 may then be applied to the perimeter of a fire-rated panel 205 that is nearest the edge 209 of the fire-rated door 200. Lastly, the edge filler plate 206 may be inserted into the pocket 203 for the edge filler plate and secured to the edge 209 of the fire-rated door 200 using two fasteners 207.

Figure 3A:
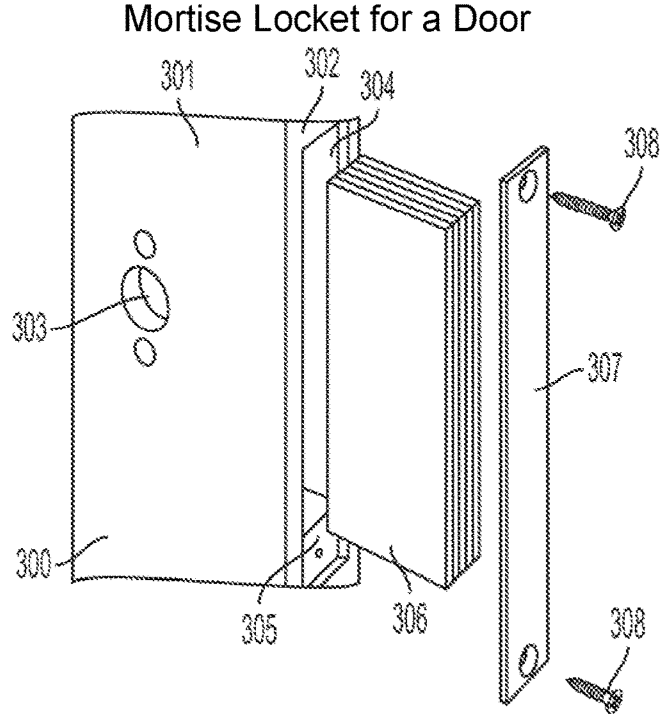
FIG. 3A illustrates a perspective view of a third example application for a mortise lockset in a fire-rated door, according to an aspect of the present disclosure.

In accordance with certain aspects, the present disclosure may be applied to a mortise lock. FIG. 3A shows a machined bore 303 for a mortise lock handle located on a fire-rated door 300. In one embodiment, a machined pocket 304 for a mortise lock body and a pocket 305 for a filler plate may be located on an edge side 302 of the fire-rated door 300. The machined bore 303 for the mortise lock handle may contain a thru-hole measuring 1.0" in diameter and two adjacent thru-holes measuring 0.375" in diameter, located on the face 301 which covers the machined pocket for mortise lock body 304. For example, the machined pocket 304 may measure 1.0" wide, 4.5" deep, and 6.5" tall and may be configured to receive a fire-rated panel 306. The machined bore 303 may fully pass through the machined pocket 304. The pocket 305 for the filler plate may be centered horizontally and vertically about the machined pocket 304 for the mortise lock body, and may measure 1.25" wide, 7.0" tall, and 0.125" deep. The pocket 305 for the filler plate may be configured to receive an edge filler plate 307 (e.g., 0.125" thick, 1.25" wide, and 7.0" tall) and may be made from cold rolled steel and contain two thru-holes for receiving fasteners 308.

Figure 3B:
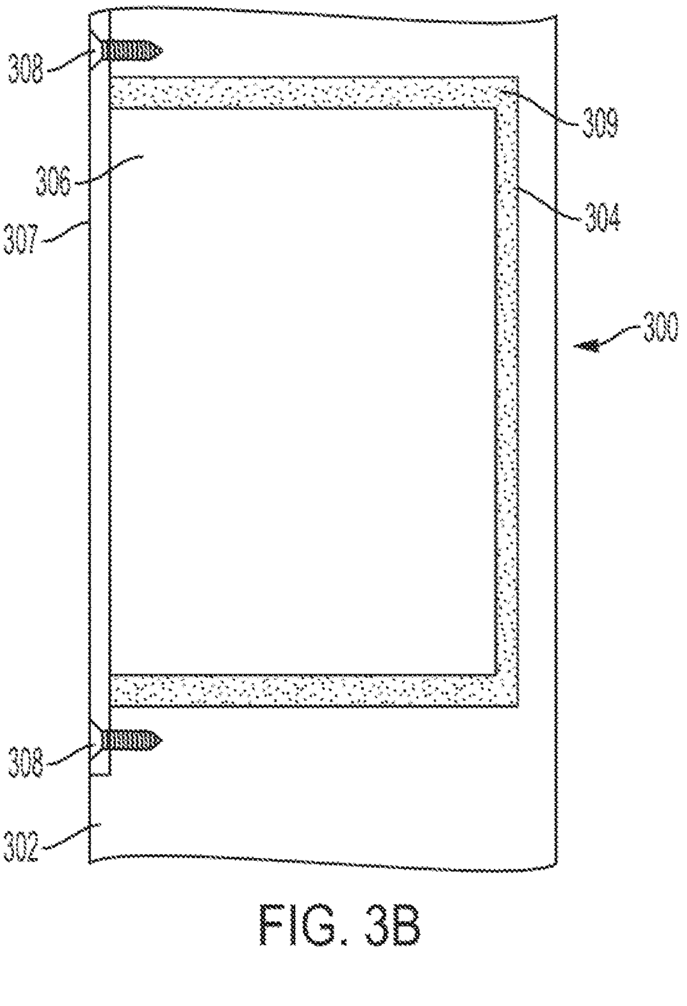
FIG. 3B illustrates an installed side view of FIG. 3A, according to an aspect of the present disclosure.

In accordance with aspects of the present disclosure, an example installation procedure of the system shown in FIG. 3B may include applying fire-rated caulk 309 to the bottom horizontal surface of the machined pocket 304 for the mortise lock body. Next, the fire-rated caulk 309 may be applied to the top and back sides of a fire-rated panel 306, which may measure 4.0" wide, 6" tall, and 0.75" thick. The fire-rated panel 306 with the fire-rated caulk 309 may then be inserted into the machined pocket 304 for the mortise lock body, resting on the fire-rated caulk 309 previously applied to the bottom horizontal surface. Subsequently, the fire-rated caulk 309 may be applied within the machined bore 303 for the mortise lock handle between the fire-rated panel 306 and each face 301 of the fire-rated door 300. Lastly, the edge filler plate 307 may be inserted into the pocket 305 for the edge filler plate and secured using two fasteners 308 (e.g., #12×0.75" screws).

Figure 4A:
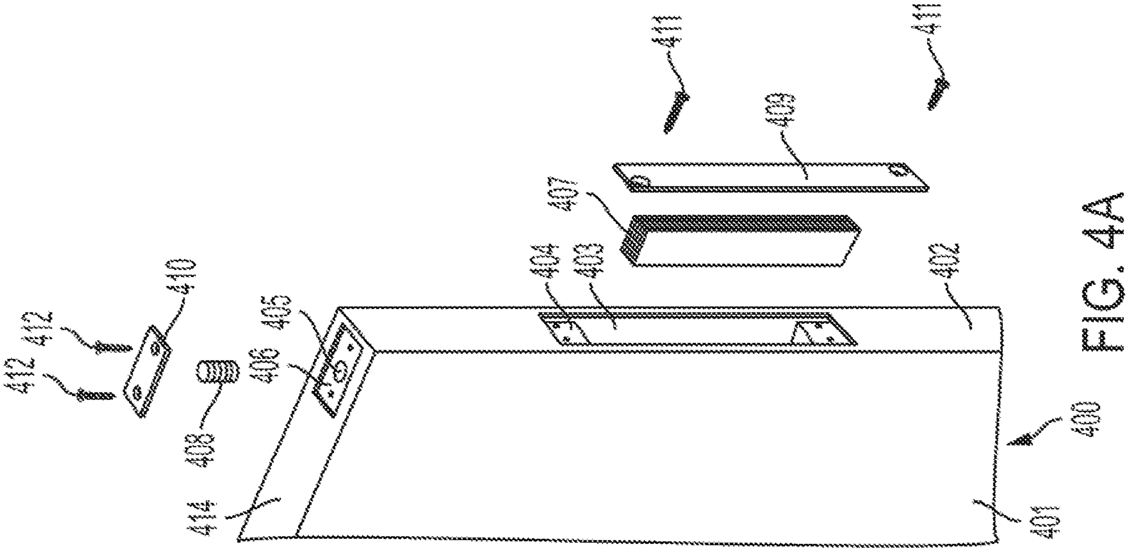
FIG. 4A illustrates a perspective view of a fourth example application for a flush bolt lockset in a fire-rated door, according to an aspect of the present disclosure.
Figure 4B:
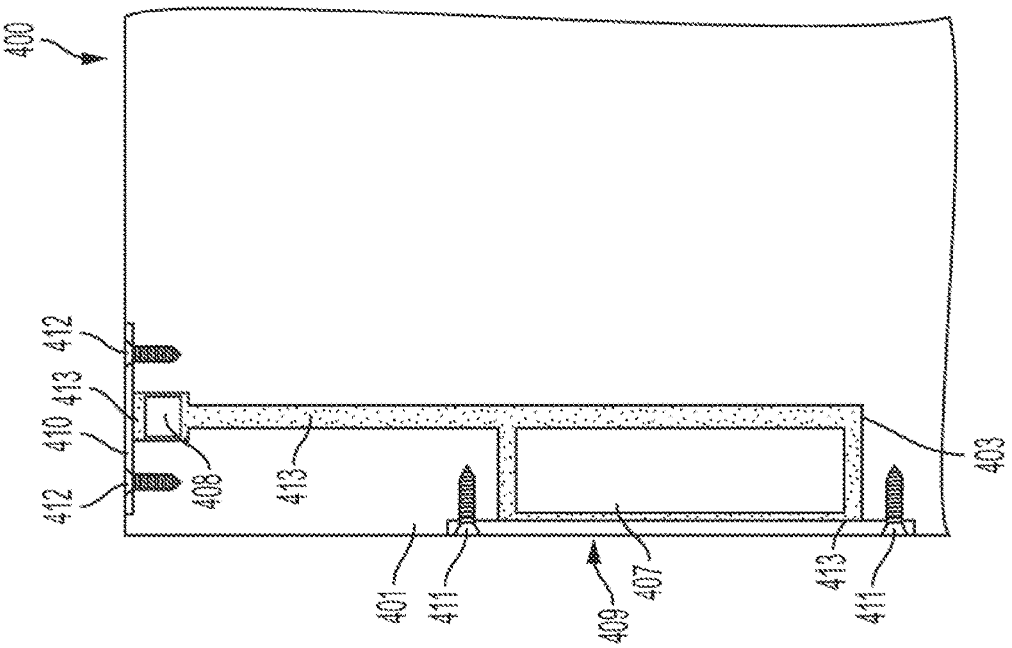
FIG. 4B illustrates an installed side view of the fourth example application of FIG. 4A, according to an aspect of the present disclosure.

A preferred embodiment of the present disclosure as applied to a flush bolt lock is shown in FIGS. 4A and 4B. Specifically, FIG. 4A shows a fire-rated door 400 with faces 401 and edge 402 machined to receive a flush bolt latch located on a top edge of the fire-rated door 400. Such a flush bolt latch is a common component to the door industry and provides a mechanism that is actuated from the edge 402 and having a latch bolt located at the top edge 414 of the fire-rated door 400.

In one aspect, a machined pocket 403 (e.g., 1.0" wide, 2.25" deep, and 6.5" tall) for a flush bolt latch body may be located 6" down from the top edge 414 and may be configured to receive a fire-rated panel 407. A pocket 404 for an edge filler plate may be horizontally and vertically centered about the machined pocket 403 for the flush bolt latch body. In one example implementation, the pocket 404 may measure 0.125" deep, 1.25" wide, and 7.0" tall, and may be configured to receive an edge filler plate 409. The edge filler plate 409 may measure 0.125" thick, 1.25" wide, and 7.0" tall and may be made from cold rolled steel and contain two thru-holes for receiving fasteners 411.

A machined bore 405 for a flush bolt latch bolt may be configured to receive a fire-rated panel 408. In one embodiment, the machine bore 405 may be located at a 2.5" backset from the edge 402 and may measure 0.75" in diameter and 1.0" deep, measuring downward from the top edge 414 of the fire-rated door 400 and then measure 0.25" in diameter extending downward and into the mortise pocket 403. A pocket 406 for a top edge filler plate may be located on the top edge 414 of the fire-rated door 400 to receive a top edge filler plate 410. In one embodiment, the pocket 406 for the top edge filler plate may measure 1.0" wide, 2.5" long, and 0.125" deep. The top edge filler plate 410 may measure 1.0" wide, 2.5" long, and 0.125" thick, and may be made from cold rolled steel and may contain two thru-holes for receiving fasteners 412.

In accordance with aspects of the present disclosure, an example installation procedure the system shown in FIG. 4B may include applying fire-rated caulk 413 to the horizontal bottom surface of the machined pocket 403 for the flush bolt latch body. Next, the fire-rated caulk 413 may be applied to the top and back edges of a fire-rated panel 407 (e.g., 2.0"×6.0"×0.75" thick) that is inserted into the machined pocket 403, resting on the previously applied fire-rated caulk 413. An edge filler plate 409 may then be inserted into the pocket 404 for the edge filler plate and secured in place using two fasteners 411 (e.g., #8×0.75" screws). Subsequently, the 0.25" diameter portion of the machined bore 405 for the flush bolt latch bolt may be filled with fire-rated caulk 413 as well as 0.125" at the bottom edge of the 0.75" diameter bore. A fire-rated panel 408 (e.g., 0.5" in diameter and 0.75" tall) may be inserted into the 0.75" diameter bore of machined bore 405 for the flush bolt latch bolt. Next, the fire-rated caulk 413 may be used to fill the remaining area around the fire-rated panel 408 until it reaches the pocket 406 for the top edge filler plate. Finally, a top edge filler plate 410 may be inserted into the pocket 406 and secured with two fasteners 412 (e.g., #8×0.75" screws).

Figure 5B:
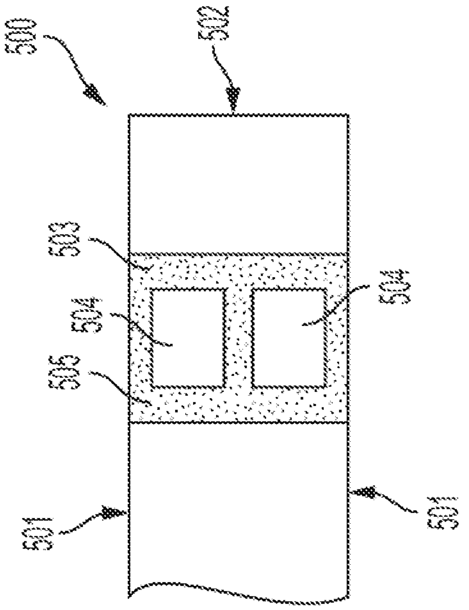
FIG. 5B illustrates an installed side view of FIG. 5A, according to an aspect of the present disclosure.
Figure 5A:
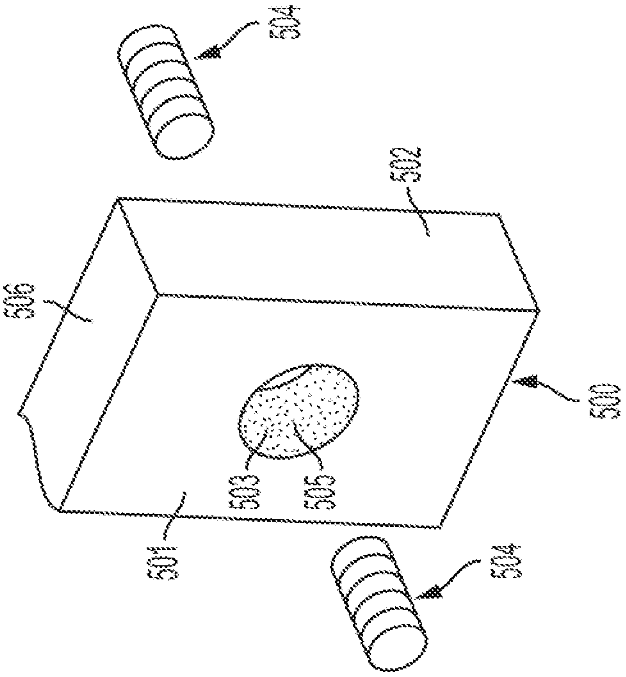
FIG. 5A illustrates a perspective view of a fifth example application for a thru-hole in a fire-rated door, according to an aspect of the present disclosure.

Yet another preferred embodiment of the present disclosure as applied to a thru-hole is shown in FIGS. 5A and 5B. Referring to FIG. 5A, a fire-rated door 500 may contain a thru-hole which may be created by a machined bore for hardware 503 such as a peep-hole viewer. The thru-hole left behind after the peep-hole is removed may measure 1.125"

in diameter, and measure 18" from an edge 502 and 24" down from a top edge 506 of the fire-rated door 500. In one embodiment, the thru-hole may extend fully between two faces 501 of the fire-rated door 500, and may receive at least two fire-rated panels 504 and fire-rated caulk 505.

In accordance with aspects of the present disclosure, an example installation procedure of the system shown in FIG. 5B may include inserting a first fire-rated panel 504 (e.g., 1.0" in diameter and 0.75" thick) into a machined bore for hardware 503 near the centerline of the fire-rated door 500. Fire-rated caulk 505 may be applied to both sides of the first fire-rated panel 504 around the perimeter, and a second fire-rated panel 504 may be inserted, leaving a small amount of fire rated caulk 505 between the two fire-rated panels 504. Next, the fire rated caulk 505 may then be applied around the perimeter of the second fire rated panel 504 and left to cure.

Among other features, the present disclosure may be configured to achieve the following objectives:

- Repair fire-rated wood doors when either removing existing hardware and/or using a new hardware type over through-holes.
- Repair fire-rated wood doors when either removing existing hardware and/or using a new hardware type over cylindrical locksets.
- Repair fire-rated wood doors when either removing existing hardware and/or using a new hardware type over mortise locksets.
- Repair fire-rated wood doors when either removing existing hardware and/or using a new hardware type over flush bolt locksets.
- Repair fire-rated steel (hollow metal) doors when either removing existing hardware and/or using a new hardware type over through-holes.
- Repair fire-rated steel (hollow metal) doors when either removing existing hardware and/or using a new hardware type over cylindrical locksets.
- Repair fire-rated steel (hollow metal) doors when either removing existing hardware and/or using a new hardware type over mortise locksets.
- Repair fire-rated steel (hollow metal) doors when either removing existing hardware and/or using a new hardware type over flush bolt locksets.

As disclosed herein, the present disclosure may utilize at least one or more fire-rated panels and fire-rated caulk to create a structural element within various cavities, holes, or voids of a fire-rated door for accommodating a wide variety of hardware, thereby maintaining and improving the structural and fire rating characteristics of the fire-rated door. In one aspect, the at least one or more fire-rated panels of the present disclosure may be dynamically dimensioned to fill voids of various sizes and dimensions on both hollow metal and wood fire-rated doors up to 90 minute fire resistance. An example fire-rated panel may have a thickness ranging from 1/32" to 1-3/4" and a size (width×height) ranging from 1/4" in diameter and 36" wide×48" height. In certain applications, the fire-rated panel of the present disclosure may be placed within 3/4" of the perimeter of the void (e.g., symmetrical or asymmetrical cavities and holes) being filled with the fire-rated panel. Importantly, the shape of the fire-rated panel may be dynamically determined based on the cavity or hole or any void of the fire-rated door being filled with the fire-rated panel (e.g., cylindrical, square, rectangular, any symmetrical or asymmetrical shapes). The density of the fire-rated panel may range from 2.0 $lb/ft^3$ to 100.0 $lb/ft^3$ and the screwpull withdraw value may be 5.0 lbs force. In certain aspect, the fire-rated panel of the present disclosure may contain a metal, may be combustible (i.e., wood cellulose, plastic, etc.) with an ignition temperature of at least 375° F., or non-combustible (i.e., mineral based such as basalt rock, pearlite, vermiculite, sodium silicate, calcium silicate, gypsum, magnesium chloride, etc.), or a combination of combustible and non-combustible materials. Moreover, one or more fire-rated panels of the present disclosure may contain at least one layer of intumescent.

Moreover, depending upon specific applications, example fire-rated caulk of the present disclosure may contain a silicate-based mineral, may contain clay-based mineral, may contain intumescent, may contain crystalline silica, may contain graphite, may contain mineral spirits, may contain quartz, may contain polymer, may contain a surfactant, may contain a sulfate, may be non-combustible, may contain metal powder, and may have a melting point greater than 1400° F.

In certain alternate embodiments, the present disclosure may utilize a layer of sheet metal and secure in place with mechanical fasteners, or use a layer of sheet metal in combination with high temp insulation such as mineral wool (rock wool), or use a layer of gypsum (i.e., sheetrock or drywall) with or without a layer of sheet metal.

The above description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Further, the above description in connection with the drawings describes examples and does not represent the only examples that may be implemented or that are within the scope of the claims.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. A system used on a door in order to maintain or improve a fire rating and compliance of the door, the system comprising:

a plurality of hardware components to replace an existing hardware of the door, wherein the door is restored to an original condition by removing the existing hardware, wherein at least one cutout portion of the door is located to accommodate at least one of the hardware components;

at least one panel sized to fill the at least one cutout portion of the door;

non-expanding sealant applied between the at least one panel and the at least one cutout portion; and at least one filler plate having a first dimension determined based at least upon a second dimension of the at least one cutout portion of the door, wherein the at least one filler plate is installed on the door to fit with the at least one cutout portion of the door.

2. The system of claim 1, wherein the door comprises a hollow metal door.

3. The system of claim 1, wherein the door comprises a fire-rate wood door.

4. The system of claim 1, wherein the at least one cutout portion of the door comprises at least one of a cavity, hole and void of the door for accommodating at least one door hardware.

5. The system of claim 4, wherein the at least one cutout portion of the door comprises a through hole on the door.

6. The system of claim 4, wherein the at least one door hardware comprises a cylindrical lockset.

7. The system of claim 4, wherein the at least one door hardware comprises a mortise lockset.

8. The system of claim 4, wherein the at least one door hardware comprises a flush bolt lock.

9. The system of claim 1, wherein the at least one panel includes a rigid and non-combustible panel.

10. The system of claim 1, wherein the at least one panel has a screw-holding characteristic.

11. The system of claim 1, wherein the non-expanding sealant is applied on a surface of the at least one cutout portion.

12. The system of claim 1, wherein the non-expanding sealant is sodium silicate-based.

13. The system of claim 1, wherein the at least one panel is machined to fit with the at least one cutout portion of the door.

14. A system used on a door in order to maintain or improve a fire rating and compliance of the door, comprising:

a plurality of hardware components to replace an existing hardware of the door, wherein the door is restored to an original condition by removing the existing hardware, wherein at least one cutout portion of the door is located to accommodate at least one of the hardware components;

at least one panel sized to fill the at least one cutout portion of the door;

non-expanding sealant applied between the at least one panel and the at least one cutout portion; and at least one filler plate installed onto the door to cover the at least one panel, wherein a first dimension of at least one filler plate is determined based upon a second dimension of at least one panel.

15. A system used on a door in order to maintain or improve a fire rating and compliance of the door, comprising:

at least one door hardware to be installed on at least one cutout portion of the door, wherein the at least one cutout portion of the door comprises at least one of a cavity, hole and void of the door, wherein the at least one door hardware comprises a cylindrical lockset;

a first panel sized to fill a first bore through faces of the door for receiving a cylindrical body and handle, wherein the first panel is inserted through the first bore;

a second panel sized to fill a second bore through an edge of the door for receiving a cylindrical lock latch bolt, wherein the first and second bores are co-planar and perpendicular to each other, wherein the second panel is inserted through the second bore;

non-expanding sealant applied between the first panel and the first bore and the second panel and the second bore; and a filler plate having a first dimension determined based at least upon a second dimension of a pocket on the edge of the door for receiving the filler plate, wherein the filler plate is installed on the edge of the door to fit with the pocket.

16. The system of claim 15, further comprising:

a pair of filler plates having first dimensions determined based at least upon second dimensions of the first and second panels, wherein the pair of filler plates are installed onto the faces of the door to respectively cover the first and second panels.

17. A system used on a door in order to maintain or improve a fire rating and compliance of the door, comprising:

at least one door hardware to be installed on at least one cutout portion of the door, wherein the at least one cutout portion of the door comprises at least one of a cavity, hole and void of the door, wherein the at least one door hardware comprises a mortise lockset having a mortise lock handle received by a bore through faces of the door and a mortise lock body received by a first pocket through an edge of the door;

at least one panel sized to fill the at least one cutout portion of the door;

a filler plate received by a second pocket on the edge of the door; and non-expanding sealant applied between the at least one panel and the bore, wherein the at least one cutout portion of the door is filled with the at least one panel.

18. The system of claim 17, wherein the at least one panel has a first dimension determined based on a second dimension of the first pocket, the at least one panel is placed in the first pocket, the filler plate has a third dimension determined based at least upon a fourth dimension of the second pocket, and the filler plate is installed on the edge of the door to fit with the second pocket.

19. A system used on a door in order to maintain or improve a fire rating and compliance of the door, comprising:

at least one door hardware to be installed on at least one cutout portion of the door, wherein the at least one cutout portion of the door comprises at least one of a cavity, hole and void of the door, wherein the at least one door hardware comprises a flush bolt lock;

at least one panel received by a bore on a top edge of the door and a first pocket on an edge of the door;

a first filler plate received by a second pocket on the edge of the door;

a second filler plate received by a third pocket on the top edge of the door;

non-expanding sealant between the at least one panel and the bore, wherein the at least one cutout portion of the door is filled with the at least one panel.

20. The system of claim 19, wherein the at least one panel comprises a first panel sized to fill the first pocket, and a second panel sized to fill the bore, wherein the first panel is placed in the first pocket, wherein a first dimension of the first filler plate is determined based at least upon a second dimension of the second pocket, the first filler plate is installed on the edge of the door to fit with the second pocket, wherein the second panel is inserted in the bore, a third dimension of the second filler plate is determined based at least upon a fourth dimension of the third pocket, wherein the second filler plate is installed on the top edge of the door to fit with the third pocket.

* * * * *